United States Statutory Invention Registration [19]

[11] Reg. Number: H45

Gilmore [45] Published: Apr. 1, 1986

[54] PORTABLE CUTTING APPARATUS

[75] Inventor: Richard F. Gilmore, Kennewick, Wash.

[73] Assignee: The United States of America as represented by the United States Department of Energy, Washington, D.C.

[21] Appl. No.: 631,697

[22] Filed: Jul. 17, 1984

[51] Int. Cl.[4] ..... B24B 21/00

[52] U.S. Cl. ..... 51/135 R; 30/92; 30/166 R; 82/101; 83/651.1; 51/241 S; 51/328

[58] Field of Search ..... 51/99, 135 R, 142, 147, 51/170 R, 170 EB, 217 R, 217 P, 290, 241 R, 241 S, 328, DIG. 5; 125/21; 82/101; 269/32, 34, 156; 30/92, 166 R; 83/651.1, 794

[56] References Cited

U.S. PATENT DOCUMENTS

| | | | |
|---|---|---|---|
| 2,850,926 | 9/1958 | Jobe | 269/34 X |
| 3,263,535 | 8/1966 | Zurcher | 269/156 X |
| 3,630,391 | 12/1971 | Wilson | 269/32 X |
| 3,817,510 | 6/1974 | Jatchko | 269/34 |
| 3,882,598 | 5/1975 | Earle et al. | 51/273 X |
| 3,985,051 | 10/1976 | Brown | 82/101 |
| 4,016,856 | 4/1977 | McLaughlin | 51/135 R X |
| 4,379,042 | 4/1983 | Inoue | 51/328 X |

FOREIGN PATENT DOCUMENTS

| | | | |
|---|---|---|---|
| 2423140 | 12/1979 | France | 30/166 R |
| 2437278 | 5/1980 | France | 125/21 |
| 2089708 | 6/1982 | United Kingdom | 269/34 |

*Primary Examiner*—Harold J. Tudor
*Attorney, Agent, or Firm*—Robert Southworth, III; Judson R. Hightower

[57] ABSTRACT

A remotely operable, portable cutting apparatus detachably secured to the workpiece by laterally spaced clamp assemblies engageable with the workpiece on opposite sides of the intended line of cut. A reciprocal cutter head is mounted between the clamp assemblies and is provided with a traveling abrasive cutting wire adapted to sever the workpiece normal to the longitudinal axis thereof. Dust and debris are withdrawn from the cutting area by a vacuum force through a nozzle mounted on the cutting head.

15 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PORTABLE CUTTING APPARATUS

The U.S. Government has rights in this invention pursuant to Contract No. DE-ACO6-76FFO2170 between the U. S. Department of Energy and Westinghouse Electric Corporation.

BACKGROUND OF THE INVENTION

This invention relates generally to a portable cutting apparatus and, more particularly, to a remotely controlled portable cutting apparatus detachably secured to the workpiece intended to be severed.

In nuclear reactor facilities, much of the maintenance and servicing must be done remotely to prevent radioactive contamination of the personnel performing these tasks. Such work is further complicated by space limitations due to the piping, accessory components and other hardware typically found in these environments. For example, the remote severing or removing of a section of a pipe located in a radioactive containment, such as a typical glovebox for example, and which is congested with auxillary hardware and piping poses problems. Conventional portable pipe cutters, while admirably serving the purposes for which they were designed, generally are not suited for these special applications. Generally, they incorporate metal removal tooling, such as milling, turning or reciprocating saws, which are large and bulky and usually are provided with single clamps that require manual attachment to the piping. Moreover, the motor and control components are in close proximity to the workpiece, contributing to the bulk and weight of the apparatus that must be handled. Also, these known pipe cutters often require stress-loaded power drive components causing wear and deterioration of their gears and shafts, accompanied by dulling and chattering of the cutting tools with consequent breakage and failure.

Accordingly, it is an object of the present invention to obviate the above-noted shortcomings by providing a new and improved portable cutting apparatus especially adapted for remote operation.

It is another object of this invention to provide the foregoing cutting apparatus with a novel tool clamping arrangement for firmly securing the workpiece on opposite sides of the intended cut and insuring absolute square cutting normal to the axis of the workpiece.

It is a further object of the present invention to provide a new and improved portable cutting apparatus which is simple and strong in construction, compact and lightweight, durable in use for repeated operations, and easily manipulated in space restricted areas.

These and other objects, advantages, and characterizing features of the present invention will become clearly apparent from the ensuing detailed description of an illustrative embodiment thereof, taken together with the accompanying drawings wherein like reference numerals denote like parts throughout the various views.

SUMMARY OF THE INVENTION

A portable cutting apparatus including an elongated frame having laterally spaced clamp assemblies for firmly attaching the cutting apparatus to the workpiece to be severed. The clamp assemblies each include a pair of pivotal jaws acutated to engage the workpiece on opposite sides of the intended line of cut. A reciprocal cutting head having a traveling cutting wire thereon is mounted on the frame between the clamp assemblies and, with the workpiece securely clamped, is advanced to the workpiece for severing the same.

DESCRIPTION OF THE PREFERRED EMBODIMENT

Figure 1:
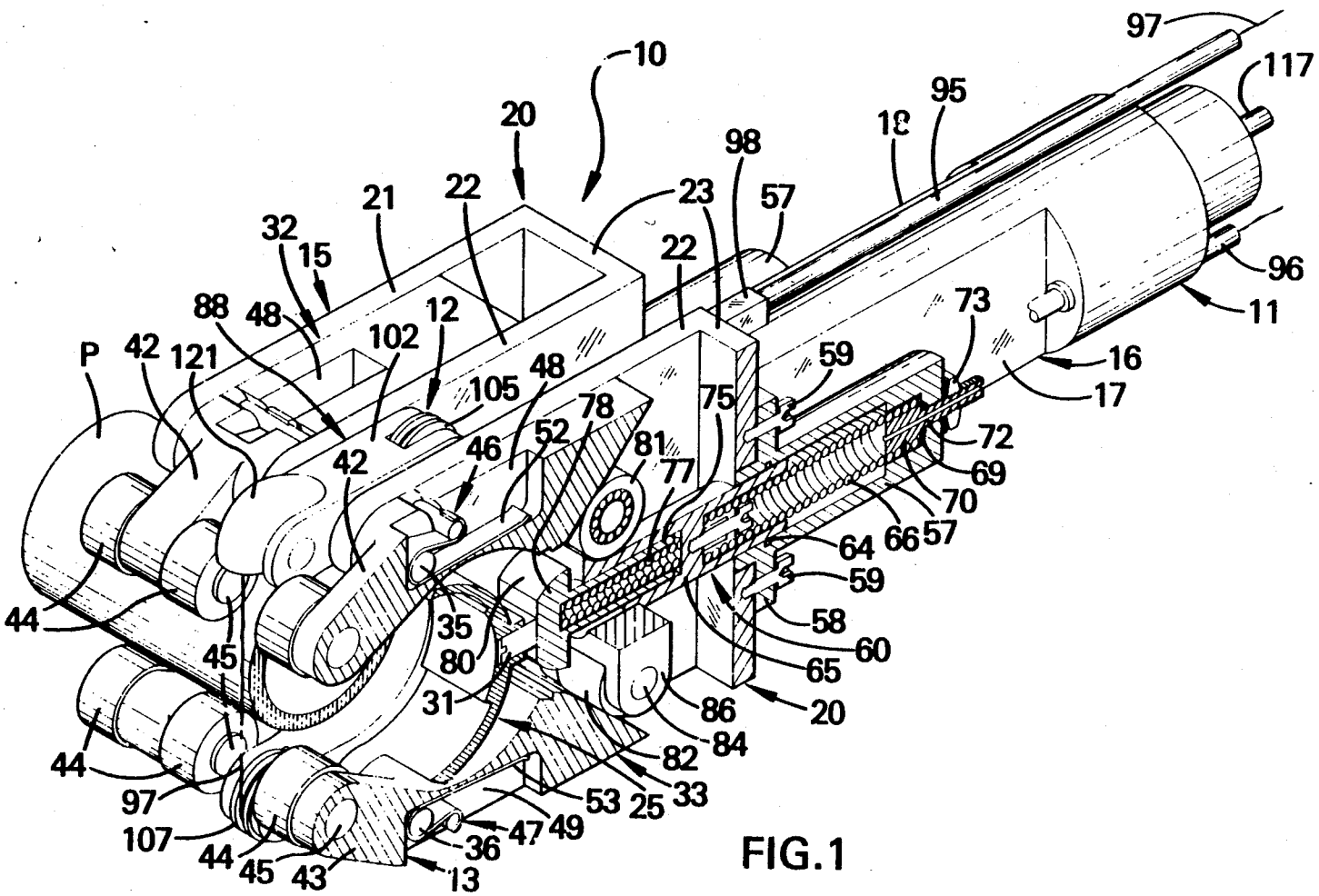
FIG. 1 is a perspective view, partially in section, of a cutting apparatus constructed in accordance with this invention.

Referring now in detail to the illustrative embodiment depicted in the accompanying drawings, there is shown in FIG. 1 a portable cutting apparatus, comprehensively designated 10, comprising an elongated frame or mast 11 supporting a cutter mechanism 12 and a pair of dual-clamp assemblies 13 and 15 disposed on opposite sides of the cutter mechanism 12. The cutter mechanism 12 and clamp assemblies 13 and 15 are movable along with the mast 11, as well as relative thereto when actuated. The mast 11 is formed with a reduced width portion 16 having flat exterior opposite surfaces 17 and 18 for the attachment of other components thereto.

Figure 3:
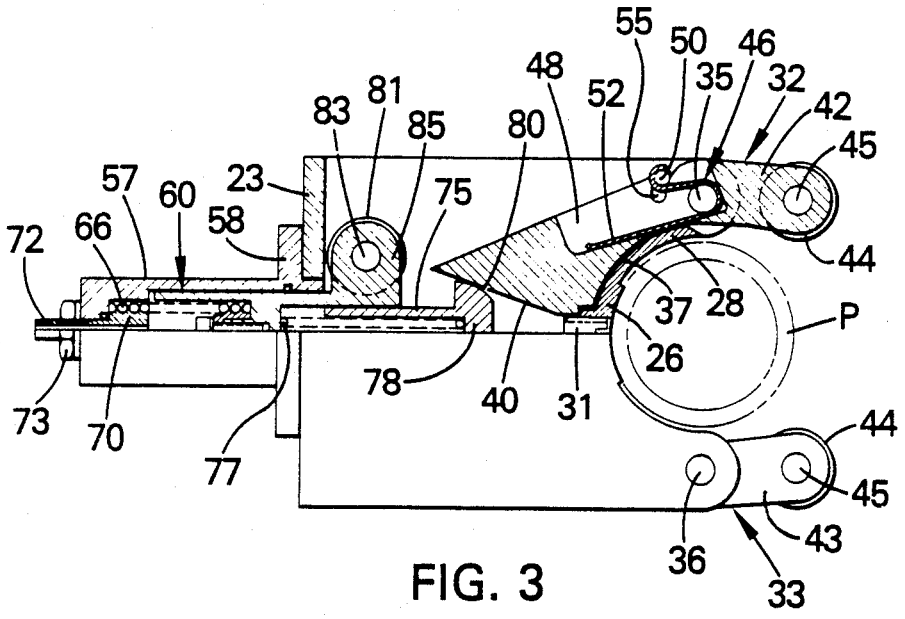
FIG. 3 is a side elevational view, partially in section, showing the clamping arrangement forming a part of this invention in an open position.
Figure 4:
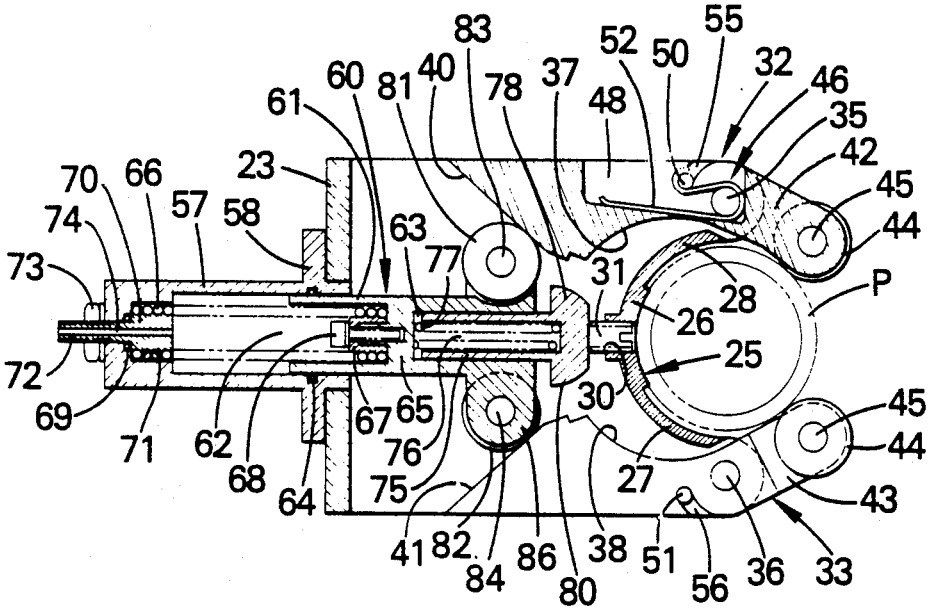
FIG. 4 is a longitudinal sectional view, partially in elevation, showing the clamping arrangement in a closed position.

The clamp assemblies 13 and 15 are mirror images of each other and are identical in construction and operative in the same manner. Accordingly, it is believed that a detailed description of only one, say clamp assembly 13, will suffice for both and the same reference numerals will be applied to identical elements. Clamp assembly 13 comprises a housing 20 having a pair of laterally spaced side walls 21 and 22 and a rear end wall 23. The front end of housing 20 is open and supports an arcuately shaped shoe 25 of a generally C-shaped configuration in cross section adapted to engage the pipe P to be severed. As best shown in FIGS. 3 and 4, shoe 25 is formed with a thick central portion 26 and thinner opposite end portions 27 and 28. The central portion 26 is formed with a tapped opening 30 adapted to receive a threaded stop member 31. The curved inner surface of shoe central portion 26 serves to automatically position the apparatus 10 relative to the pipe P when advanced thereto.

A pair of clamping jaws 32 and 33 are mounted within the housing 20 for pivotal movement about pivot pins 35 and 36 secured at their respective opposite ends in side walls 21 and 22. The jaws 32 and 33 are formed with inner surfaces having forward arcuate portions 37 and 38 complementary in shape to the outer surface of shoe 25 and straight rear portions 40 and 41 retreating away from portions 37 and 38 at angles relative to a true horizontal in a diverging relation. The jaws 32 and 33 are provided with forward portions 42 and 43, respectively, extending at angles in a converging relation relative to the outer surfaces of the major portions of jaws 32 and 33. The forward portions 42 and 43 are provided with dual anti-friction rollers 44, respectively, on opposite sides thereof and are rotatably journaled on shafts 45 extending transversely through portions 42 and 43.

Means are provided for biasing the jaws 32 and 33 in their open or non-clamping position shown in FIG. 3. Such means include specially configurated leaf springs 46 and 47 in recesses 48 and 49 formed in the jaws 32 and 33. These springs are anchored at their one ends about studs 50 and 51 and extend forwardly therefrom to and about pivot pins 35 and 36 and then rearwardly to form elongated portions 52 and 53 disposed against the bottom walls defining recesses 48 and 49. The force exerted by spring portions 52 and 53 bias the rear portions of jaws 32 and 33 inwardly toward each other as shown in FIG. 3 to maintain the forward portions 42 and 43 in an open position. The studs 50 and 51 are affixed to the housing inner wall 22 and are accommodated in arcuate slots 55 and 56 formed in the jaws 32 and 33.

The means for actuating jaws 32 and 33 to their closed or clamping positions includes a fluid cylinder 57 welded or otherwise fixedly secured to the flat portion 17 of mast 11 and having a flange 58 rigidly secured to the rear end wall 23 of housing 20 by fasteners 59. The cylinder 57 is provided with a reciprocal piston assembly 60 having an elongated cylindrical body 61 formed with opposite cavities 62 and 63 separated by a central web 65. An O-ring seal 64 is disposed in a suitable groove formed in the inner wall surface of cylinder 57 to provide a fluid tight seal between the piston assembly 60 and cylinder 57. A helical tension spring 66 is disposed in the cavity 62 and is fixed at one end on a peripherally grooved retainer 67 secured in place against the web 65 by a fastener 68 threaded into the web 65. The other end of the spring 66 is fixed on a peripherally grooved retainer 70 mounted in a cylindrical recess 71 formed in cylinder 57 near the outer end thereof. The retainer 70 is formed with an elongated threaded stem 72 projecting axially through the rear end of cylinder 57 for receiving a nut 73. An O-ring seal 69 is disposed in a suitable groove about the stem 72 to provide pressure sealing between the latter and cylinder 57. An axial passage 74 is provided in threaded stem 72 for directing fluid under pressure from a suitable source (not shown) into the cylinder 57.

A plunger 75 is mounted in cavity 63 for reciprocal movement therein and is formed with a cavity 76 for receiving a helical compression spring 77 bearing at its one end against the end wall defining cavity 76 and at the other end against web 65. The forward end of plunger 75 is formed with an enlarged head or bumper 78 adapted to engage stop 31. The bumper head 78 is provided with a slightly curved peripheral surface 80 functioning as a cam for engagement with the opposite surface portions 40 and 41 of jaws 32 and 33 for pivoting them to initiate the clamping operation, as will hereinafter be more fully explained. The piston body 61 also is provided with upper and lower cam rollers 81 and 82 journaled for rotation on shafts 83 and 84 mounted in upper and lower brackets 85 and 86 forming a part of the piston assembly 60.

Figure 2:
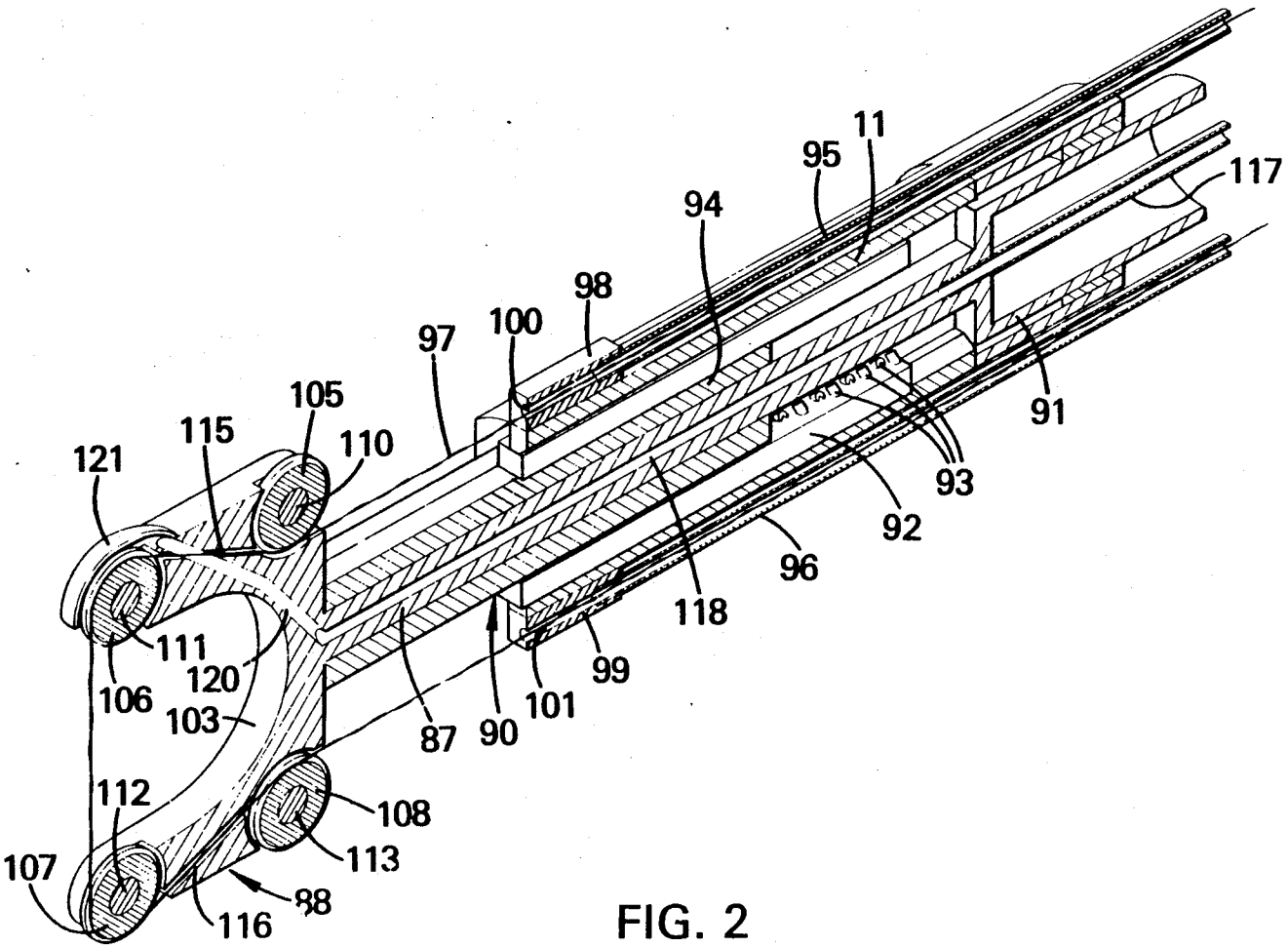
FIG. 2 is a perspective, longitudinal sectional view of the cutter mechanism of this invention.

The cutter mechanism 12 is mounted between the clamp assemblies 13 and 15 for bodily movement therewith and for reciprocal movement relative thereto. As best shown in FIG. 2, the mechanism 12 comprises a stem 87 mounted for reciprocal movement within the mast 11 and having an enlarged cutting head 88 at the forward end thereof. The stem 87 is provided with an enlarged diameter portion 91 at the rear end thereof which projects axially rearwardly past the end of mast 11. A cross roller bearing slide 90, of the type manufactured by Micro Slides Inc. of Westbury, N.Y., is interposed between the stem 82 and the wall of mast 11 to facilitate anti-friction sliding movement therebetween. The cross roller bearing slide 90 includes fixed rails 92 secured to the inner wall surface of mast 11 for supporting a plurality of angularly inclined roller bearings 93 and slide rails 94 moveable thereon and attached to the forward portion of stem 87.

Upper and lower guide tubes 95 and 96 are located on the exterior of mast 11 for guiding the cutting wire 97 employed to sever the workpiece. These tubes 95 and 96 are connected at their forward ends to guide blocks 98 and 99 fixedly secured to the outer surface of the mast 11. The guide blocks 98 and 99 are formed with through bores 100 and 101, respectively, coaxially aligned with the guide tubes 95 and 96.

The cutting head 88 includes a generally flat plate-like body 102 having a generally arcuately shaped cut-out section of generally semi-circular shape and defined by an inner curved wall surface 103. The head 88 is provided with a pair of upper, longitudinally spaced, grooved pulleys 105 and 106 and a pair of lower, longitudinally spaced, grooved pulleys 107 and 108. The pulleys 105–14 108 are mounted for rotation on shafts 110–113, respectively, mounted on the cutting head 88 adjacent the four corners thereof. An internal passage 115 extends diagonally between the lower end of pulley 105 and the upper end of pulley 106. Another passage 116 extends diagonally between the lower end of pulley 107 and the upper end of pulley 108. Thus, a path for the cutting wire 97 is provided from a suitable source (not shown) through the inlet lower guide tube 96 to the upper end of pulley 108, passage 116, about pulley 107, vertically upwardly to and about pulley 106, passage 115, the lower end of pulley 105 and return through outlet upper tube 96 to the source. Suitable means (not shown) are provided for feeding the wire at a high rate of speed through this path. Likewise, a suitable power means, such as a stepping electric motor for example, can be employed to advance and retract the stem 87, as required.

In order to remove debris and dust resulting from the cutting operation, the apparatus 10 is provided with vacuum means. Such means include an elongated conduit 117 leading from a suitable vacuum source (not shown) and connected to the stem 87 which is formed with a central passage 118 coaxially aligned with the conduit 117. A passage 120 is formed in cutting head 88 and communicates at its outer end with central passage 118 and at its inner end with a curved nozzle 121 directed downwardly toward the work area and along the vertical portion of the cutting wire 97.

The cutting wire 97 preferably is formed from drawn and tempered high-tension material, such as stainless steel, to provide strength, durability and flexibility. The cutting wire 97 is coated with a desirable abrasive such as diamond, boron nitride, silicon carbide or aluminum oxide, for example. These abrasives can form with the selected material of the cutting wire a firm bond. The wire is advanced at speeds ranging from 1,000 to 3,500 surface feet per minute (sfm) for achieving smooth, severed edge finishes from 35 to 40 microinches.

Figure 5:
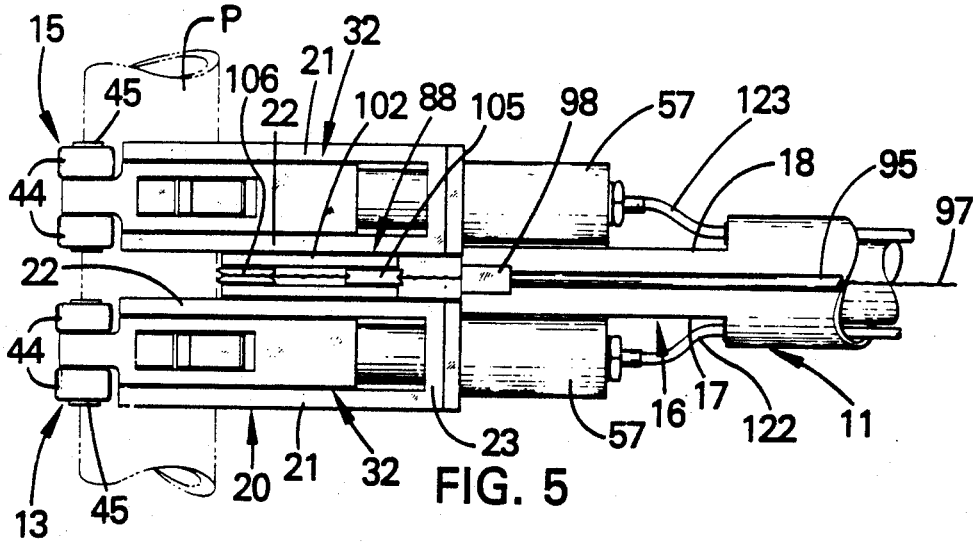
FIG. 5 is a top plan view of the cutting apparatus of FIG. 1, showing the cutter mechanism in a retracted position.

In operation with the clamping jaws 32 and 33 in an open position (FIG. 3) and the cutter head 88 retracted as shown in FIG. 5, the cutting apparatus 10 is advanced in an axial direction to the workpiece, pipe P, until the central portion 26 of shoe 25 engages with pipe P. The shoe 25, as well as the de-activated clamping jaws 32 and 33, provide a natural socket for initial pipe engagement. Fluid under pressure is then directed from a suitable source (not shown) through conduits 122 and 123 and passages 74 into the two cylinders 57 to activate them in unison. The pressure in each cylinder 57 overcomes the bias of spring 66 to advance the piston assembly 60, carrying plunger 75 therewith to initiate the clamping operation and pivot the jaws 32 and 33 about pins 35 and 36 by the camming action of bumper 78. This action continues until the bumper 78 engages stop 31, leaving the rear ends of jaws 32 and 33 sufficiently spread apart to permit engagement of cam rollers 81 and 82 therewith. Continued advancement of the piston assembly 60 compresses spring 77 within the plunger 75 while advancing the rollers 81 and 82 to effect further pivoting of jaws 32 and 33 until the several rollers 44 firmly engage the pipe P. The engagement of the laterally spaced upper and lower dual rollers 44 along the outer side of the pipe P and the shoe central portion 26 at the inner side thereof effects a three point, self-aligning clamping action firmly securing the apparatus 10 to the pipe P while accurately and precisely positioning the cutting head 88 for a true 90° square cut. The pivoting of jaws 32 and 33 compresses or otherwise loads the leaf springs 46 and 47 as shown in FIG. 4.

Figure 6:
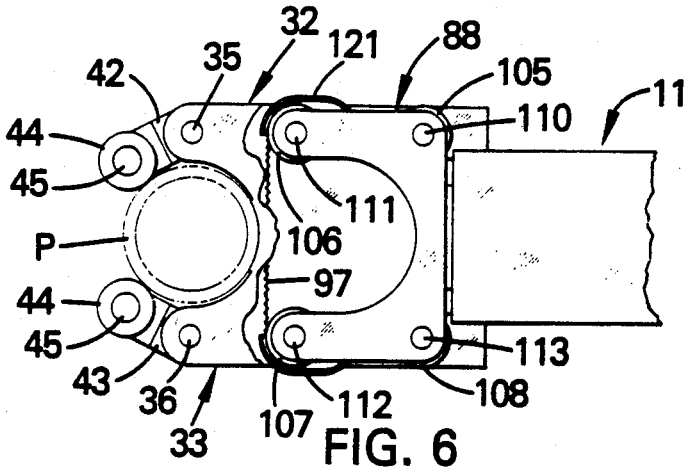
FIG. 6 is a side elevational view, with parts broken away for clarity, showing the cutter mechanism immediately prior to advancement into the workpiece.
Figure 7:
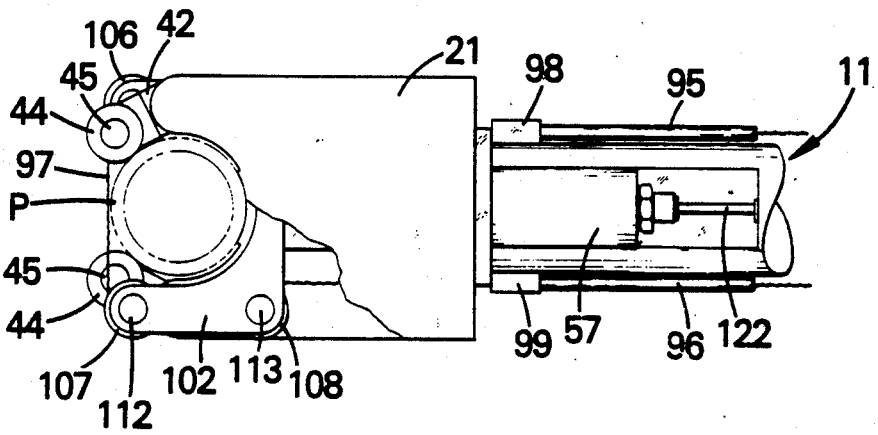
FIG. 7 is a side elevational view, with parts broken away, showing the cutter mechanism immediately after a cutting operation.

Once the pipe is firmly clamped by jaws 32 and 33, the abrasive cutting wire 97 is set in motion at the appropriate speed and cutting head 88 is advanced from its retracted position shown in FIG. 6 toward the pipe P. The traveling wire penetrates the inner side of the pipe and slices therethrough as the cutter head is advanced relative to the clamp assemblies 13 and 15. The debris resulting from the cutting operation is gathered by a strong vacuum force through the nozzle 121. The three-point dual clamping arrangement on opposite sides of the cutting head 88 prevents the severed pipe ends from pinching the traveling cutting wire 97 before the cut is completed.

After the cutting operation, the cutting head 88 is retracted and pressure from each cylinder 57 is vented, allowing the influence of springs 66 and 77 to return the piston assembly 60 to its normal, retracted position. The rollers 81 and 82 are retracted and disengaged from the rear ends of jaws 32 and 33, in turn, disengaged from the pipe P and returned to their open position by virtue of the bias of leaf springs 46 and 47. If a pipe section is to be removed, the cutting apparatus 10 is relocated to another position along the pipe to sever the pipe at such position, the severed section being maintained in place by one of the clamp assemblies 13, 15. The clamp assembly attached to the severed section remains clasped while the other clamp assembly can be disengaged, thereby permitting removal of the severed section by the retraction of the entire cutting apparatus 10.

All operations, including cutting apparatus movement, clamp actuation, cutting wire travel, and cutter head feed are controlled by equipment and components located remotely from the workpiece, thereby permitting the use of conventional power sources, drives and feed arrangements, while protecting personnel. Moreover, this portable cutting apparatus is compact and lightweight, requiring a radial clearance of only about 1.5 inches beyond the outer surface of the pipe P, whether the latter is of a 2 inch diameter as depicted in the drawings or substantially larger, such as an 8 inch diameter pipe for example. Additionally, the apparatus 10 is operative under substantially vibration free, low-powered loadings to enhance long-term, repeatable service. Also, it should be appreciated that the apparatus 10 can be employed in any angular orientation so that the cutting wire can travel vertically downwardly or horizontally, if desired, or at any angular attitude relative to a true vertical or horizontal.

From the foregoing, it is apparent that the objects of the present invention have been fully accomplished. As a result of this invention, a remotely operated and controlled portable cutting apparatus is provided for detachable engagement with the workpiece to be severed. The clamping arrangement provides for three-point contact on either side of the intended line of cut to effect self alignment in a manner positioning the cutting wire precisely normal to the axis of the workpiece. This arrangement produces a straight, square cut and precludes the severed pipe edges from pinching the traveling cutting wire.

The foregoing description of a preferred embodiment of this invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of this invention and its practical application to thereby enable others skilled in the art to utilize the invention in various embodiments and with various modifications as are suited to the particular use contemplated. It is intended that the scope of the invention be defined by the claims appended hereto.

I claim:

1. A portable pipe cutting apparatus comprising: an elongated frame, a pair of laterally spaced clamp assemblies mounted on said frame, each of said clamp assemblies comprising a pair of clamping jaws mounted on said frame for pivotal movement between an inoperative position and a work engaging position, means normally biasing said jaws into said inoperative position, means for actuating said jaws into said work engaging position to clamp a workpiece therebetween, a reciprocal cutter mechanism mounted on said frame between said clamp assemblies and including a traveling cutting wire, and means for advancing said cutter mechanism relative to said clamp assemblies to bring said cutting wire into engagement against said workpiece for severing said workpiece.

2. A cutting apparatus according to claim 1, wherein said clamping jaws of each clamp assembly are mounted for pivotal movement about parallel axes extending generally normal to the longitudinal axes of said jaws.

3. A cutting apparatus according to claim 1, wherein said clamping jaws are elongated members formed with opposed cam surfaces adjacent one ends thereof and provided with a pair of laterally spaced work engaging elements, respectively, at the other ends thereof.

4. A cutting apparatus according to claim 3, wherein said actuating means comprises first cam means engagable with said opposed cam surfaces for initiating pivotal movement of said jaws about said axes and second cam means axially spaced from said first cam means and engagable with said cam surfaces for completing pivotal movement of said jaws for swinging said work engaging elements into pressure clamping engagement against said workpiece.

5. A cutting apparatus according to claim 4, including an actuator having a reciprocal piston, a plunger mounted in said piston, said first cam means formed on the distal end of said plunger and said second cam means mounted on said piston rearwardly of said first cam means.

6. A cutting apparatus according to claim 1, including a shoe mounted adjacent the leading end of said frame and engagable with said workpiece for self-orienting said apparatus relative to said workpiece.

7. A cutting apparatus according to claim 6, wherein said shoe has a workpiece engaging surface complementary to the shape of said workpiece.

8. A cutting apparatus according to claim 6, wherein said shoe and said jaws of each assembly in said work engaging position form a three point engagement with the workpiece on opposite sides of the intended line of cut.

9. A cutting apparatus according to claim 1, including vacuum means on said cutter mechanism for removing debris resulting from a cutting operation.

10. A cutting apparatus according to claim 9, wherein said vacuum means includes a passage formed in said cutter mechanism and terminating at one end thereof in a nozzle on said cutting head and communicating at the other end thereof with conduit means connected to a vacuum source.

11. A cutting apparatus according to claim 1, including a plurality of pulleys mounted on said cutting head for guiding said cutting wire in a predetermined path.

12. A cutting apparatus according to claim 11, wherein a portion of said traveling cutting wire path lies in a plane normal to the longitudinal axis of said workpiece.

13. A cutting apparatus according to claim 1, wherein said cutting wire is coated with a layer of abrasive material.

14. A cutting apparatus according to claim 1, wherein said cutting wire travels at a speed ranging from 1,000 to 3,500 surface feet per minute.

15. A cutting apparatus according to claim 1, wherein said biasing means comprises a leaf spring associated with each clamping jaw, each leaf spring fixedly secured at one end and having a portion at the other end thereof bearing against said associated jaw.

* * * * *